United States Patent [19]

Brindöpke

[11] 4,178,500
[45] Dec. 11, 1979

[54] ELECTRICALLY HEATABLE HOUSEHOLD APPLIANCE

[75] Inventor: Dieter Brindöpke, Mettmann, Fed. Rep. of Germany

[73] Assignee: Robert Krups, Solingen, Fed. Rep. of Germany

[21] Appl. No.: 885,567

[22] Filed: Mar. 13, 1978

[30] Foreign Application Priority Data

Mar. 16, 1977 [DE] Fed. Rep. of Germany ....... 2711402
Nov. 19, 1977 [DE] Fed. Rep. of Germany ....... 7735481

[51] Int. Cl.² ............................................. H05B 3/06
[52] U.S. Cl. ..................................... 219/524; 99/374; 99/379; 219/351; 219/386; 219/521
[58] Field of Search ............... 219/385, 404, 411, 521, 219/524, 525, 347, 351, 354, 430, 432, 433, 434; 99/340, 372, 376, 377, 379, 425, 421 H

[56] References Cited

U.S. PATENT DOCUMENTS

| | | | |
|---|---|---|---|
| 2,719,903 | 10/1955 | Oertli | 219/525 |
| 2,748,690 | 6/1956 | Lipsich et al. | 99/340 |
| 3,146,692 | 9/1964 | Connolly et al. | 99/379 |
| 3,172,999 | 3/1965 | Sutton et al. | 219/524 |
| 3,304,406 | 2/1967 | King | 219/411 |
| 3,839,050 | 10/1974 | Gordon | 99/421 H X |
| 3,974,358 | 8/1976 | Goltsos | 219/525 X |

Primary Examiner—Volodymyr Y. Mayewsky
Attorney, Agent, or Firm—Michael J. Striker

[57] ABSTRACT

The electrically heatable household appliance is assembled of a stationary lower part and a swingable upper part connected to the former by an adjustable hinge joint, each part supporting an electrically heated plate and at least one part comprising a protective plate of ceramic material transparent to infrared radiation. The protective plate is preferably removably connected to a supporting frame which is disconnectably mounted to the assigned part to facilitate cleaning.

19 Claims, 16 Drawing Figures

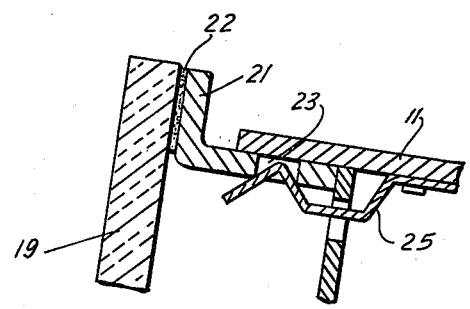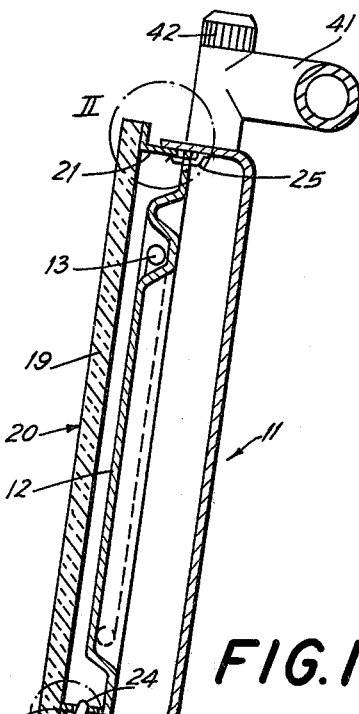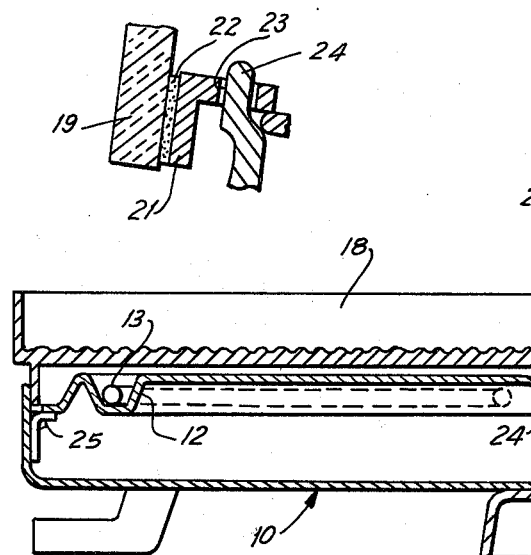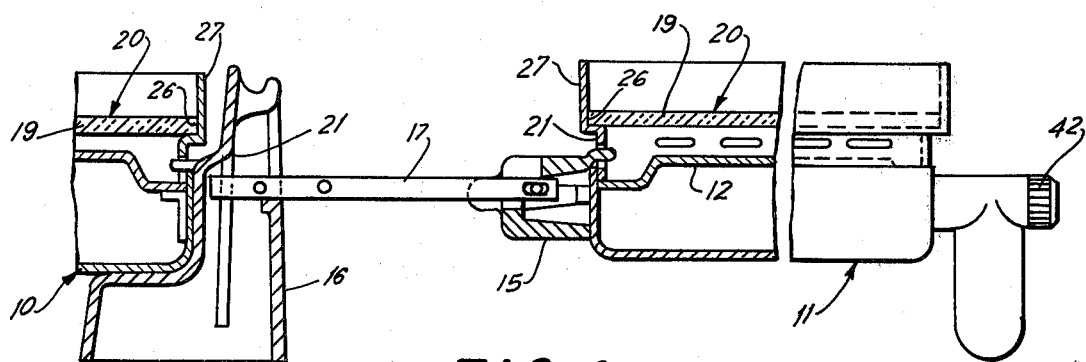
FIG. 2
FIG. 3
FIG. 1
FIG. 4

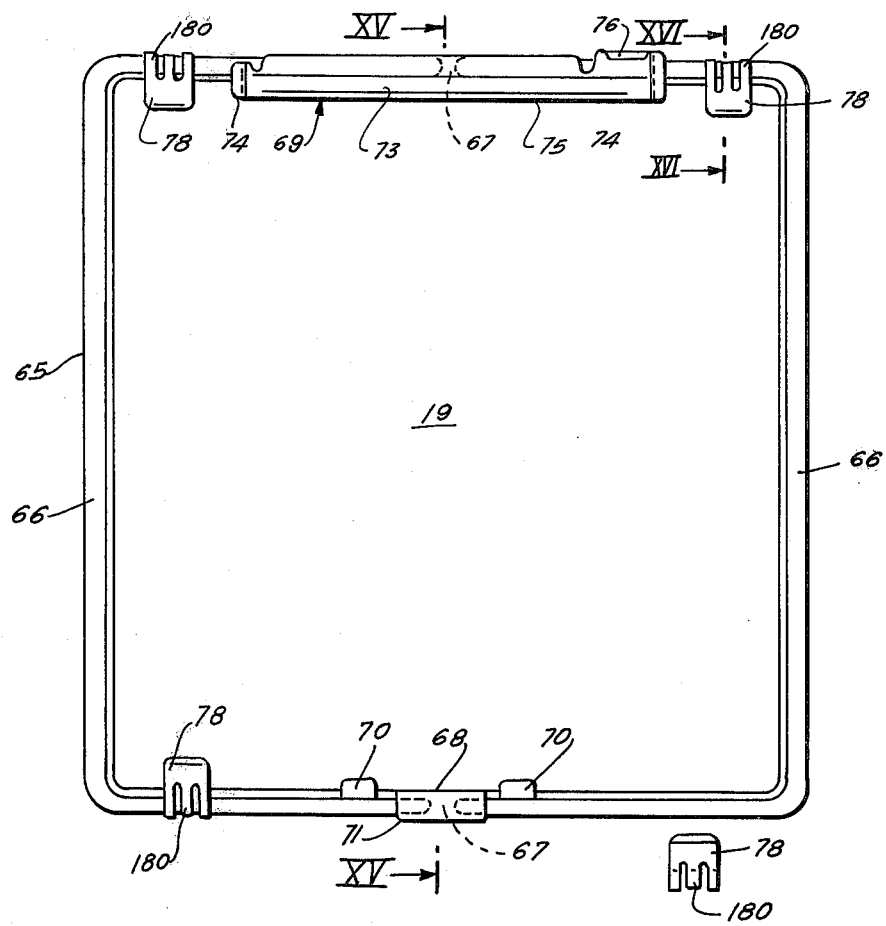
FIG. 14
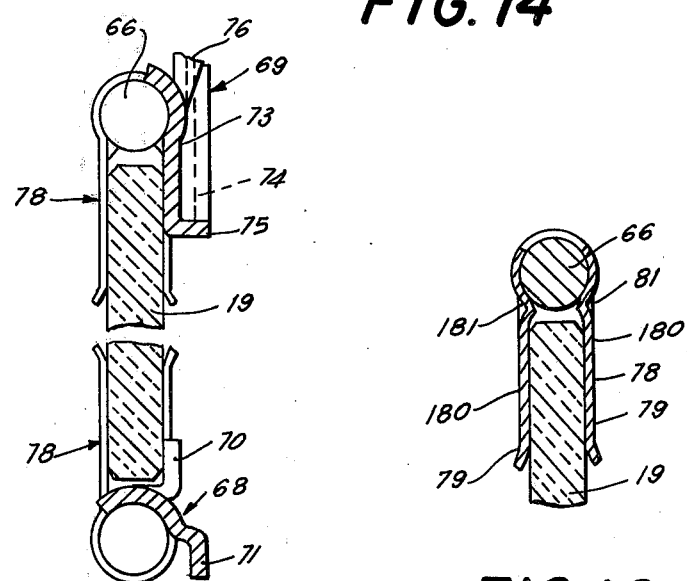
FIG. 15
FIG. 16

ELECTRICALLY HEATABLE HOUSEHOLD APPLIANCE

BACKGROUND OF THE INVENTION

The invention relates to an electrically heatable household appliance assembled of a stationary lower part supporting a hot plate and a movable upper part also supporting a hot plate, the upper part being connected to the lower part by an adjustable hinge joint having abutment surfaces for supporting the upper part in its closed horizontal position; the hinge joint portion which is connected to the upper part of the appliance is adjustably connected to at least one arm or link that is hinged to the lower appliance part and has bearing surfaces for holding the upper part in a desired swing-open position as described in the German patent application No. P 26 02 716.7.

The household appliance of this kind has numerous advantages residing especially in the fact that the upper part of the appliance can be adjusted with respect to the lower part according to the thickness of the food product inserted for cooking between the two hot plates. This adjustment of the level of the upper appliance part does not impair the parallelity of the hot plates and, moreover, there is a possibility to hold the upper appliance part in other positions, namely in addition to the aforementioned parallel or closed position at adjustable levels with respect to the lower hot plate, in the second position the upper appliance part is swung open slightly above 90° with respect to the lower hot plate and finally, in the third position the upper part is swung about 180°, whereby in each of those positions the upper part is fixedly supported. Nonetheless the disadvantage of the above described cooking appliance can be seen in that the product to be cooked or broiled is exposed to the contact heat or to the indirect radiation from the hot plate only whereas the direct infrared irradiation of the cooked or broiled product by the heating spiral itself would be possible only then when the hot plate is removed. This removal, however, is hardly feasible because of the defilement of the heating spiral and of its supporting member functioning as a heat reflector, the defilement resulting from the spattered grease or fat particles. A problem-free cleaning of the heating spiral and of the reflector is hitherto impossible.

SUMMARY OF THE INVENTION

It is therefore the primary object of this invention to provide a household appliance of the aforementioned type which while maintaining the advantages of the known appliances, would enable the direct exposure of the grilled or cooked product to infrared radiation from the heating spiral without any danger of polluting the infrared heating element and the reflector.

Another object of this invention is to provide a household appliance which can be easily cleaned.

A still further object of this invention is to provide a household appliance which is relatively easy to manufacture and which has replaceable heat radiating parts.

In pursuance of the above objects, and others which will become apparent hereafter, one feature of the invention resides in the provision of at least one protective plate covering the infrared heating spiral and consisting of a glass ceramic material that is transparent to infrared radiation. The glass ceramic material having this quality are commercially available under the trademark CERAN. The "Ceran" plates distinguish themselves by an approximately 70% diathermancy or transparency to infrared radiation. In this manner it is possible that the product to be grilled can be directly exposed to infrared radiation of the electrical heating element while eliminating the defilement or tarnishing of the heating element and of its supporting member that acts as a reflector of the infrared rays. In order to employ the "Ceran" glass ceramic plate not only as an infrared transmitting member for protection against fat splattering but also for the transfer of contact heat on the grilled product, the protective glass ceramic plate in the arrangement of this invention has a shaped upper surface on the side thereof that is remote from the heating spiral. For this purpose the upper surface of the glass ceramic plate is preferably undulate so that it can be manufactured in a continuous extrusion process.

According to another feature of this invention, the protective glass ceramic plate is firmly connected to a support and by means of the support it is disconnectably mounted to the upper and/or the lower part of the appliance at a small distance from the heating spiral and its supporting plate. In this manner the glass ceramic plate can be easily detached from its supporting upper or lower appliance part or again reinserted into that part; the cleaning after use is thus considerably facilitated and, moreover, the plate is protected against bending which might cause its breakage. The supporting member for the glass ceramic plate has preferably the form of an angle frame that on its end face is secured to the periphery of the glass ceramic plate by a heat-resistant adhesive.

The frame is provided on its two opposite sides with apertures for engaging retention springs on the one side and plug-in fingers on the other side of the upper or lower appliance part.

For utilizing the infrared radiation also in the baking and cooking process, the supporting member for the glass ceramic plate has according to another feature of this invention upwardly directed walls that surround the ceramic plate to form therewith a tray or pan for receiving the product to be broiled or grilled. For this purpose the supporting member for the glass ceramic plate can be made for instance as a frame having a Z-shaped cross section whereby the glass ceramic plate is secured to its intermediate arm by means of an adhesive. As an adhesive for securing the glass ceramic plate to its supporting member could be employed for example a silicon adhesive. The grilling tray of this kind is used with advantage on the horizontally positioned lower appliance part and is spaced at a minute distance from the heating spiral and its supporting member to which is in the aforementioned manner secured by means of holding fingers and snap-in retention springs. It is of course possible to replace the above-described grilling tray by a dish-shaped glass ceramic plate secured to its supporting member that, for example, can be made as an angled frame.

In another modification of this invention the household appliance of the above-described type can be used for grilling of food on a spit in such a way that the upper appliance part has a flat glass ceramic plate whereas the lower part supports a broiling tray which while the upper part is swung into a perpendicular, slightly rearwardly inclined position, receives a grease intercepting and splatter protecting cap which on its rear end abuts against the flat ceramic plate and on its front end has a loading opening covered with a protective shield. The splatter intercepting cap is formed thereby of two side walls and a top wall connecting the two side walls. The splatter intercepting cap can be easily inserted into the grilling tray provided on the lower appliance part and can be opened only at its front end for loading the foods to be cooked. At the same time the splatter intercepting cap can be used as a support for the grilling spit upon which the product to be grilled may be turned. For this purpose, the splatter intercepting cap is provided, preferably on its side walls, with elongated slits extending from its front end and being arranged one above the other for receiving the supporting spit for the grilled product.

In order to securely cover the loading opening of the splatter intercepting cap, the protective shield has a matching U-shaped cross-section and is provided on its free ends with flat projections or fingers alternately projecting from the inner and outer surfaces of the shield to engage the opposite marginal wall portions of the splatter intercepting cap.

To provide a space-saving arrangement for storing the intercepting cap the two side walls of the cap are according to another feature of this invention connected to the top wall by means of hinges and the foldable side walls are provided with a locking device for holding the side walls in a perpendicular position with respect to the top wall during the use of the cap.

According to still another feature of this invention the glass ceramic plate is removably mounted to its supporting frame by means of clamps and the supporting frame itself is also removably connected to the assigned appliance part by the aforementioned plug-in and snap-in spring arrangement. Preferably, the supporting frame is made of a round rod and is connected to the glass ceramic plate by at least two U-shaped clamps arranged at opposite sides of the frame, thus enabling the glass ceramic plate to be securely and simply inserted and held in the plane of the frame whereas the frame itself can be releasably connected by simple plug-in and snap-in projections into the household appliance. The replacement of the glass ceramic plate is made easily by disengaging the snap-in spring from the corresponding opening in the frame and by removing the clamps from the glass ceramic plate whereupon it becomes completely disconnected from the frame and all these parts are ready for cleaning.

In order to improve the clamping action of the clamps, the bent part of the U-shaped clamps is extended by depressions toward the surface of the supporting round rod of the frame and the two clamping arm portions near the depressed area of the clamp are resilient.

A simple manufacture of the frame for supporting the glass ceramic plate is achieved according to a still further feature of this invention when the frame is assembled of two substantially U-shaped yokes which at their facing free ends are firmly connected by splice straps provided with seats for the glass ceramic plate and with limit means for abutment against the upper appliance part. The seats facilitate the insertion of the glass ceramic plate into the frame.

To avoid excessive heating of the handle that is attached to the upper appliance part, the splice strap facing the attachment point of the handle on the upper part is provided with a spacer for holding the glass ceramic plate a small distance from the attachment point.

To insure a reliable snap-in connection of the frame together with the glass ceramic plate to the upper part of the household appliance, the splice strap facing the attachment point of the handle is provided with an outwardly directed holding arm for abutment against a resilient stop arm arranged on the juxtaposed side of the upper part. The other splice strap which is arranged near the hinge joint is provided, apart from the seats for the glass ceramic plate, with an angle projecting outwardly for being inserted in a corresponding opening in the upper part. This opening in the upper part is made in a shoulder projecting above the edge of the upper part whereas the splice strip adjacent to the attachment point of the handle is provided with supporting arms which abut upon the edge of the upper part so that between the upper part and the frame with the glass ceramic plate a space results forming an outlet passage for the heat accumulated in the upper part.

Other features which are considered as characteristic of the invention are set forth in particular in the appended claims. The improved thermal electric household appliance itself, however, both as to its construction and its mode of operation, together with additional features and advantages thereof, will be best understood upon perusal of the following detailed description of certain specific embodiments thereof with reference to the accompanying drawings:

BRIEF DESCRIPTION OF THE DRAWINGS

FIG. 1 is a side sectional view of a household appliance of this invention in its swung open position slightly above 90°;

FIG. 2 is an enlarged side view of a detail II of FIG. 1 showing the snap-in connection of a ceramic plate supporting frame to the upper appliance part;

FIG. 3 is an enlarged side view of a detail III of FIG. 1 showing plug-in connection of the supporting frame for the glass ceramic plate to the upper appliance part;

FIG. 4 is a cut-away side view, partly in section of the household appliance of this invention in the swung open position of its upper part about 180°;

FIG. 14 is a plan view of the glass ceramic plate releasably mounted on a supporting frame;

FIG. 15 is the supporting frame together with the glass ceramic plate in a section taken along lines XV—XV in FIG. 14; and FIG. 16 is a cut-away view of a portion of the supporting frame with an attached glass ceramic plate taken along line XVI—XVI of FIG. 14.

DESCRIPTION OF THE PREFERRED EMBODIMENTS

Figure 5:
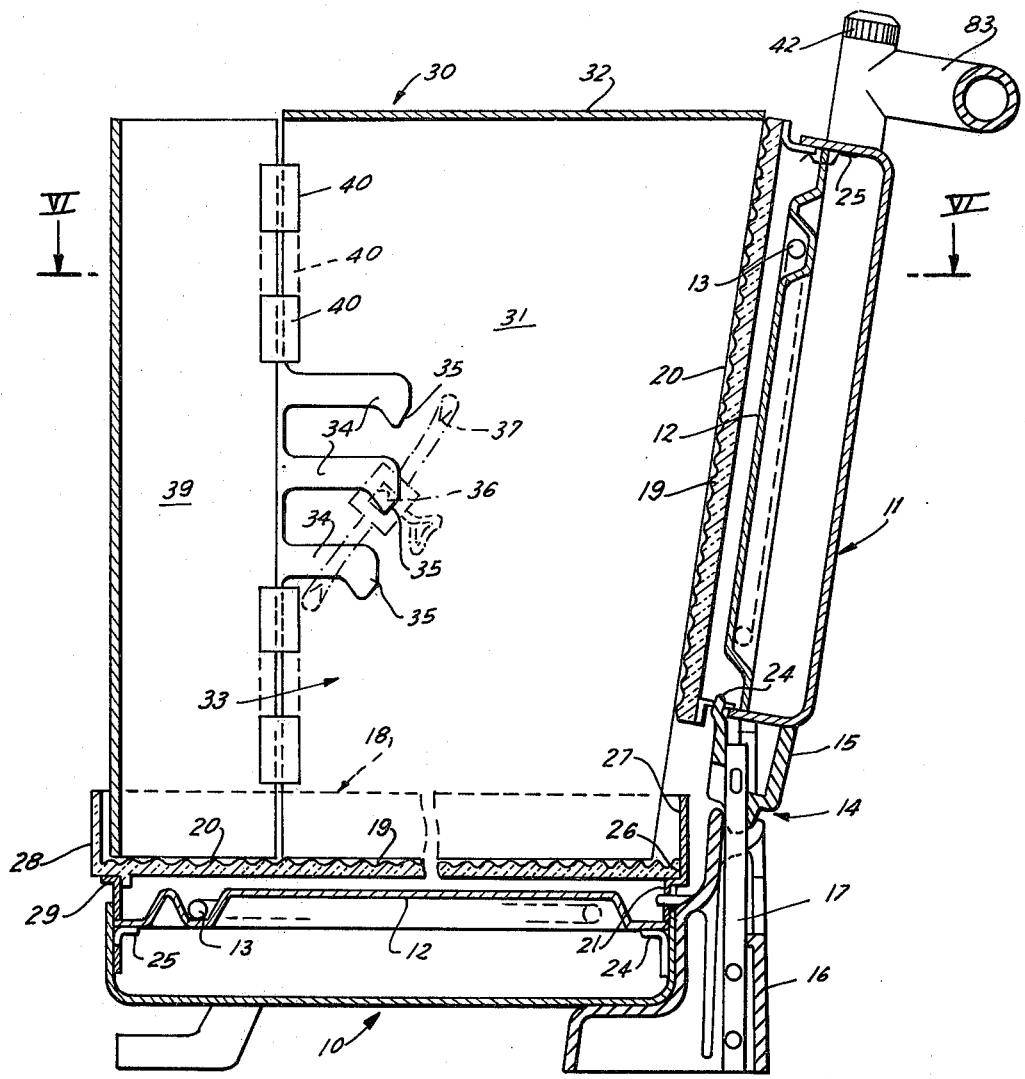
FIG. 5 is a side view partly in section of the appliance of this invention showing a splatter intercepting cap installed in the cooking or grilling tray on the lower part of the appliance and closed by a protective shield.

The electrically heatable household appliance according to this invention consists of a stationary lower part 10 and a swingably mounted as well as vertically adjustable upper part 11, the both parts having each a hot plate including infrared heating spiral 13 embodied in a supporting member 12 that also serves as a reflector for the infrared radiation. In order to swing the upper part 11 relative to the lower part 10, a hinge joint 14 links together the rear sides of the lower parts 10 and the upper part 11. The hinged joint 14 includes an upper hinge portion 15 and a lower hinge portion 16 which are coupled or linked together by a supporting link 17. In this arrangement the lower hinge part 16 is also employed as the rear support leg for the lower part 10 of the household appliance. The structure and the function of the hinge joint 14 are described in detail in the aforementioned German patent application No. P 26 02 716.7.

The heating spiral 13 mounted on the supporting member 12 is covered, both on the lower part 10 and on the upper part 11, by slipped-on hot plates. Such a hot plate can be made in the form of a grilling tray 18 as shown in FIG. 1, for example and coupled to the lower part 10 of the household appliance. The embodiment shown in FIG. 1 consists of the grilling tray 18 that conventionally is made of metal. The hot plate connected to the upper part 11 and covering from a small distance the heating spiral 13 and its supporting and heat reflecting member 12, however, is made in accordance with this invention of a glass ceramic plate 19 which is transparent to infrared rays. Even if the upper surface 20 of the glass ceramic plate 19 can be made smooth, it is nonetheless advantageous to shape it for contacting the foods to be grilled and, as illustrated particularly in FIG. 5, the upper surface 20 is preferably undulated. In the shown examples of embodiments of the glass ceramic plate 19 the same is mounted on a support 21 that itself is connected to the upper part 11 of the household appliance as shown in FIGS. 1-3. The supports 21 for the glass ceramic plate 19 can be made for instance of angular straps or may consist of a frame having angular cross-section. In the given example the frame 21 is cemented to the glass ceramic plate 19 in such a manner that a layer of a silicon adhesive 22 is applied on the flat shoulders of the support 21 to connect thereto peripheral portions of the glass ceramic plate 19. The remaining shoulders of the support 21 facing the housing of the appliance are provided with apertures 23 into which holding fingers 24 of the upper hinge joint part 16 on the one side, and snap-in springs 21 connected to the upper part 11 of the appliance on the other side, engage. In this way the glass ceramic plate 19 can be any time disconnected from the upper part 11.

In the aforementioned German patent application No. P 26 02 716.7, there has been described a metal hot plate having a fluoroplastic lining and mounted in the above-described manner to the lower part 10 of the appliance. Instead of such a metallic hot plate there can be used exactly the same glass ceramic plate 19 as in the upper part 10.

It is, however, advantageous to arrange on the lower part 10 a cooking or grilling tray 18, as shown in FIG. 1, so that the product to be cooked or broiled is held in a stable position on the hot plate and, at the same time, grease or fat particles splattered during the grilling or broiling process can be intercepted. Moreover, it is advantageous to improve the performance of the cooking or broiling process by exposing the broiling product not only to the contact heat but also to apply additional radiation heat from the heating spiral 13. For this aim, the grilling or broiling tray 18 is also provided with a glass ceramic plate 19 which makes it possible to increase the efficiency of the cooking or grilling process. This modified grilling tray 18, as seen from FIGS. 4 and 5, can be simply made by using a support 21 whose free shoulders 27 surround the end walls of the glass ceramic plate 19 and project upwardly above the upper surface 20 of the ceramic plate. In this case the support 21 consists again of a frame the cross section of which has a Z-shape. It is also possible in this case to insure a reliable and firm connection of the glass ceramic plate 19 to the support 21 by a heat-resistant adhesive.

As seen particularly from the left-hand side of FIG. 5, the glass ceramic plate 19 itself can have a dish-shaped configuration by providing it with a border 28 extending perpendicularly to the upper surface 20 of the ceramic plate. In this case the support 21 has the shape of an angle 29 that is comented to the lower surface at the periphery of the glass ceramic plate 19. The mounting of the modified grilling plate 18 to the lower part 10 of the household appliance can be carried out in the same manner as described above in connection with the glass ceramic plate 19 in the upper part 11 of the appliance. For this purpose, holding fingers 24 are provided for instance on the lower part 16 of the hinge joint or on the lower part 10 there are secured snap-in springs 25 which engage corresponding openings in the angular piece 29.

In order to convert the household appliance into a grilling apparatus, the upper part 11 of the appliance is swung open into the position as shown in FIGS. 1-5 and the grilling space above the lower part 10 is covered by a splatter intercepting cap 30. This intercepting cap consists substantially of three wall portions, namely of two side walls 31 and a bridging or top wall 32 which connects both side walls 31. The rear edges of the side walls 31 are adjusted in shape to the slightly rearwardly inclined position of the upper part 11 of the appliance and abut against it in the peripheral area of the glass ceramic plate 19. The splatter intercepting cap 30 is inserted into the grilling tray 18 and forms together with the lower part 10 and the upper part 11 a grilling space that is closed on all sides except the loading opening 33 at the front end. The intercepting cap 30 has a substantially U-shaped cross section and its side walls 31 are provided with elongated slits 34 extending substantially horizontally from the front edge and arranged one above the other for supporting the grilled product carrying spit. To insure a reliable holding of the spit in the spits 34 the rear ends of the horizontal slits are provided with downwardly directed recesses 35. In FIG. 5, a spit 36 with holding clamps 37 is illustrated in a dash-dot line. Instead of the above-described, horizontally arranged supporting slits 34 in the side walls 31 of the interception cap it is possible to provide inclined slits extending downwardly from the front edge of the side walls 31 so that the recesses at the ends of the slits can be dispensed with.

Figure 6:
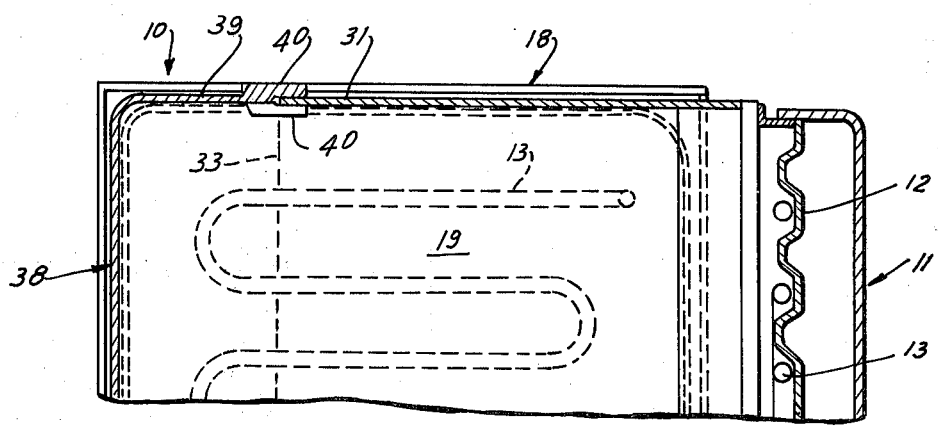
FIG. 6 is a cut-away plan view of a section of the appliance taken along lines VI—VI of FIG. 5.

Upon the suspension of the grilled product on the spit 36 the loading opening 33 can be covered by a protective shield 38 having a U-shaped cross section fitting that of the front end of the intercepting cap, as seen from FIGS. 5 and 6. To make a positive connection between the shoulders 39 of the protective shield 38 and the side walls 31 the opposite shoulders 39 are provided with projecting straps or fingers 40 arranged alternately on the outer and inner surface of the shoulders 39 so that the corresponding opposite portions of the side walls 31 can be inserted and clamped therebetween.

A yoke-shaped handle 41 is attached to the front side of the upper part 11 which can be provided with an adjustment knob 42. Whereas this adjustment knob 42 is employed for turning on and controlling the heating spiral arranged in the upper part 11, another adjustment or control knob can be provided for turning on and controlling the heating spiral 13 arranged in the lower part 10. In this manner the heating spirals in upper part 11 or in lower part 10 are made independent from each other.

Instead of cementing the glass ceramic plate 19 to its supports 21, it is also possible to use clamps or to design support 21 in such a manner that it surrounds the marginal portion of the glass ceramic plate 19. In addition, it is possible that the entire household appliance can be used as a stationary cooking apparatus by swinging the upper part 11 about 180° as shown in FIG. 4 and to provide both the lower part 10 and the upper parts 11 with the modified grilling tray 18 each including the glass ceramic plate 19. The spit 36 located in the slits of the intercepting cap 30 can be rotated either manually or by means of an electromotor, continuously or intermittently.

As shown in FIGS. 7-13, a modified version of the household appliance of this invention includes substantially U-shaped handles 82 and 83 attached respectively to attachment points on the lower part 10 and on the upper part 11 on the sides thereof remote from the hinge joint 14. The handles are shaped so as to provide a base surface for supporting the lower part 10 as well as the upper part 11 when the latter is in its swung open position about 180°. Each handle 82 and 83 further includes protective walls 84 and 85 to intercept splattered fat. The protecting walls 84 and 85 protect both the handle 36 and a switch 86 disposed on the lower handle 82 for turning on and controlling the current in both heating spirals 13. The hinge joint 14, as seen from FIGS. 7, 9 and 10 makes it possible to swing open the upper part and by means of abutment surfaces on its portions 15 and 16 as well as by a supporting link 17, to hold the upper part 11 in two different positions, namely in an upright position slightly above 90° and in a swung open position about 180°.

Figure 7:
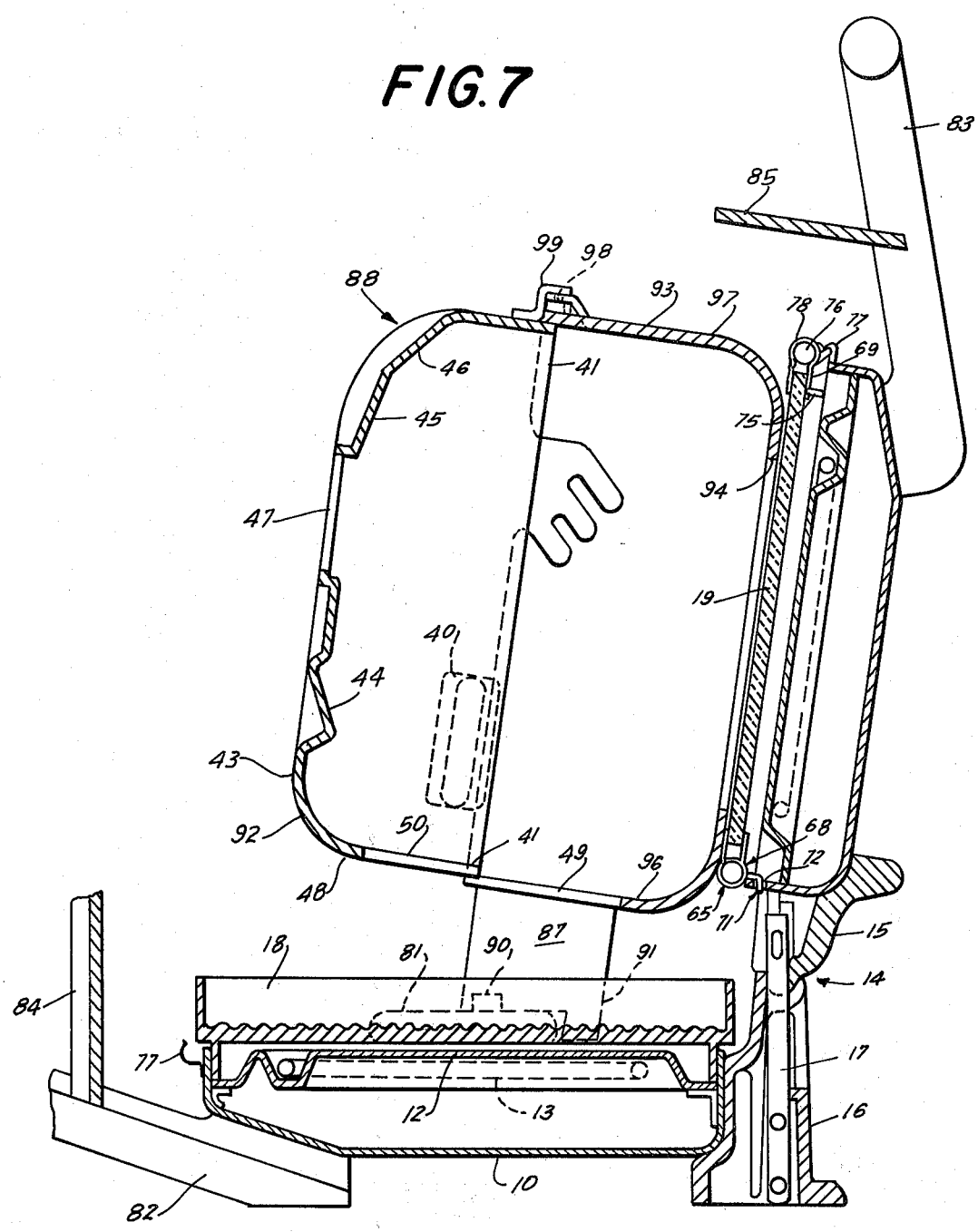
FIG. 7 is a sectional view of a modification of the appliance of this invention showing a grilling housing arranged between the lower part and the approximately upright swing-open upper part of the appliance.
Figure 8:
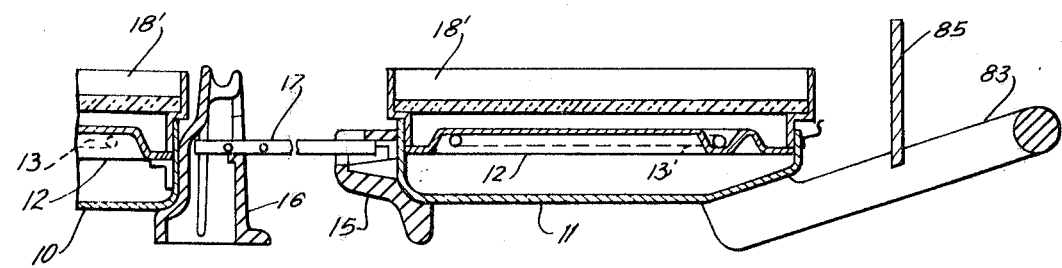
FIG. 8 shows a side view of a cut-away portion of the appliance of this invention having its upper part swung open about 180° and supporting a cooking tray.
Figure 9:
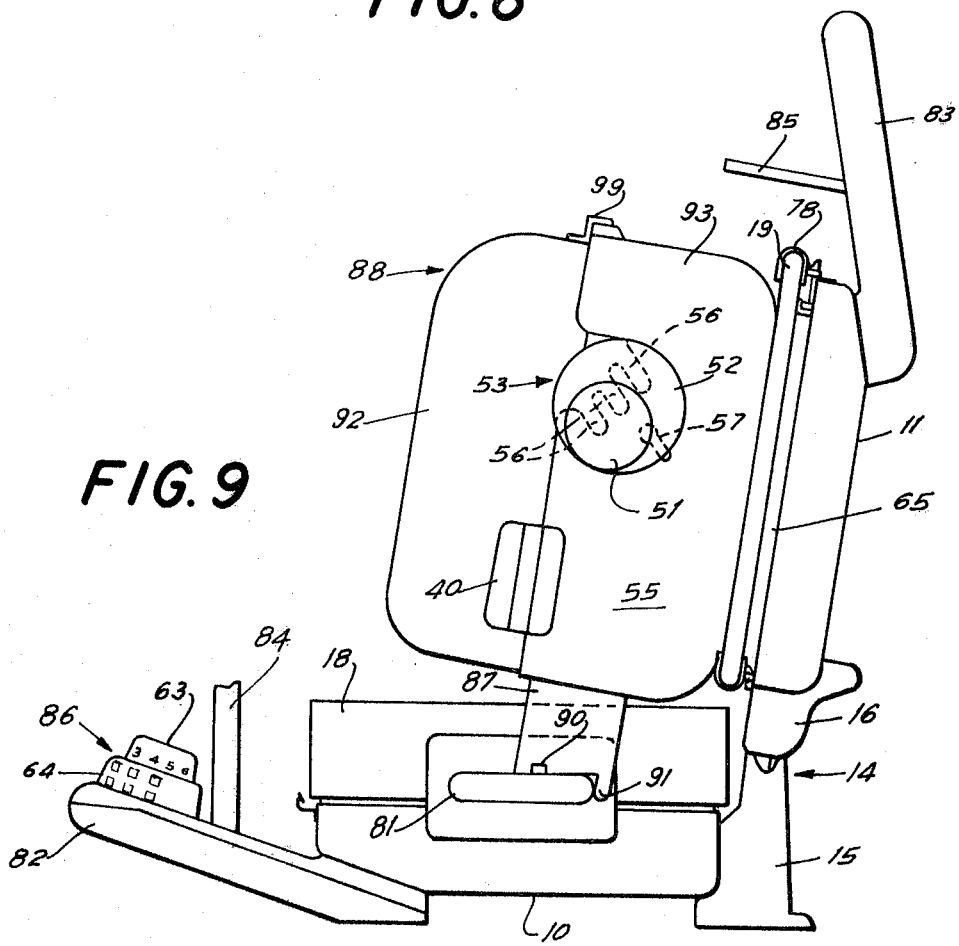
FIG. 9 is a side view of the appliance provided with a grilling housing supported on a grilling tray on the lower part of the appliance.
Figure 10:
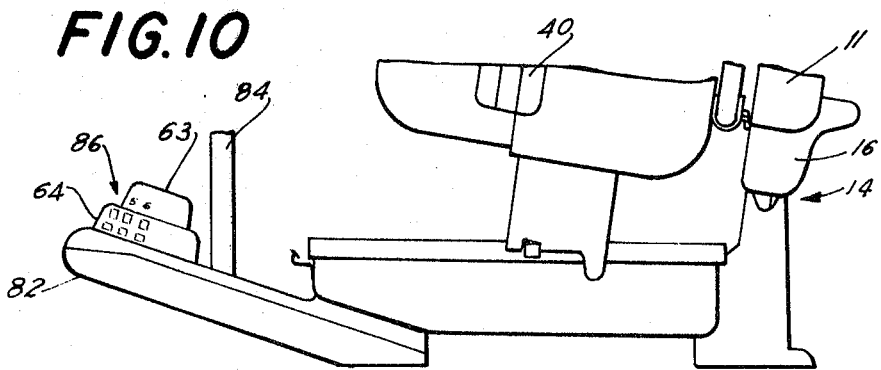
FIG. 10 is a cut-away side view of a modification of the appliance of FIG. 9 where the grilling housing is supported on projecting handles of the grilling tray.
Figure 11:
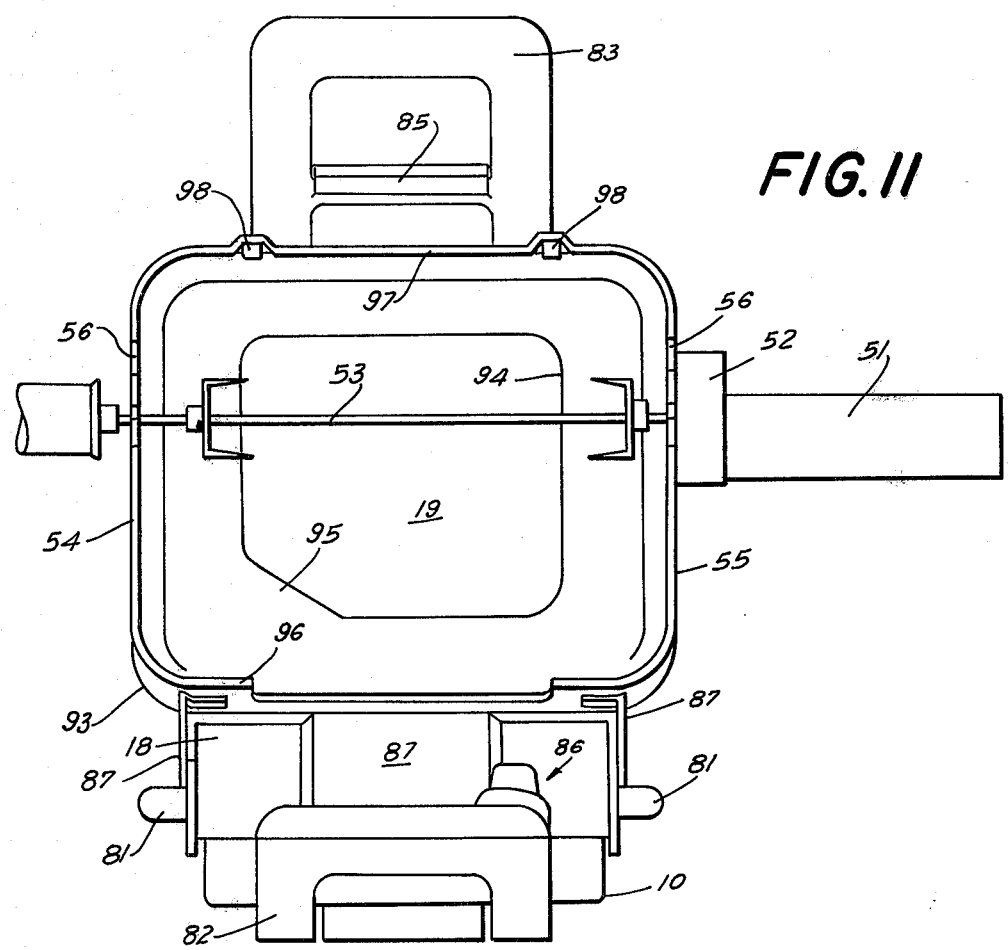
FIG. 11 is a front view of the appliance of FIGS. 9 and 10 wherein the front cover of the grilling housing is removed and the half-shell is equipped with a removable spit driven by an electromotor.

Even in this modification, the lower part 10 of the appliance can be equipped with metal hot plate 20 (FIG. 10) or with a grilling tray 18 (FIGS. 7 and 9). The metal hot plate 80 or the metal grilling tray 18 can, however, be replaced by a glass ceramic plate 19 that again may be formed as a simple hot plate or with a circumferential wall to form a grilling tray 18' (FIG. 8) as it has been mentioned previously. In this embodiment each pair of opposite sides of the grilling tray 18 is provided with a handle 81 upon which corresponding support legs 87 of a grilling housing 88 can rest. As seen from FIGS. 7 and 9, the upper part 11 is swung into a substantially upright position slightly above 90°. While the supporting legs 87 rest on the handles 81, the rear end of the grilling housing 88 is in contact with the glass ceramic plate 19 of the swung open, slightly rearwardly inclined upper part 11. In order to prevent sliding of the grilling housing each supporting leg 87 is provided with a nose engaging corresponding handles 81. As seen from FIG. 10, the lower part 10 can be covered by a hot plate 80 which is provided with two opposite lugs 89 for engaging corresponding recesses 90 in the supporting legs 87 so that the grilling housing 88 is reliably supported on the hub plate 80.

The grilling housing 88 consists of two half shells 92 and 93 each having a cup-shaped configuration with a substantially rectangular bottom surface. The rear half shell 93 has in its bottom surface an opening 94 corresponding in size to the upper surface of the glass ceramic plate 19 so that radiation of the infrared heating spiral 13 in the upper part 11 can enter the inner space of the grilling housing 88. The half shell 83 has in the area of its corners near the opening 94 an inwardly embossed or depressed wall portion 95 which covers thermostats (not shown) arranged in the upper part 11 and protects the same against reflected heat radiation. At one side wall of the half shell 93 there are arranged two supporting legs 87 which are spaced one from another about a distance that exceeds the width of the lower part 10 so that the supporting legs 87 can engage the outer surface of the grilling tray 18 or the hot plate 80 mounted on the lower part 10. The lower part 96 of the half shell 93 upon which the supporting legs 87 are mounted, faces the upper side 97 of the half shell which is provided with two openings 98 symmetrically arranged about a center plane for receiving retention lugs 99 on the half shell 92. In this manner the half shell 92 is both releasably connected to the half shell 93 to form therewith a box-like grilling housing 92 but it is also swingable with respect to the latter. The half shell 92 has near the bottom area of its side walls handles 40 and by means of its edge 41 around its front opening it snugly fits into the inner marginal portion of the half shell 93 to complete the grilling housing. To open the closed grilling housing 88 the swivel ears 99 on the half shell 92 are disengaged from the openings 98 in the half shell 93 so that the half shell 92 can be completely removed. Alternatively, the half shell 92 can be swung open upwardly in the swivel gears 99 and in its rearwardly inclined position can be rested upon the upper surface 97 of the half shell 93. The wall 43 of the half shell 92 opposite the opening 94 of the half shell 93 is provided with reflecting surfaces 44, 45 and 46 through which the heat radiation of infrared heating spiral 13 is reflected into the intermediate area of the closed housing 88. Within the central area of the wall 43 of the half shell 92 is arranged a viewing window 47 through which the grilling or broiling process can be observed. Also at the lower side 96 of the half shell 93 as well as at the lower side 48 of the half shell 92 uncovered openings 49 and 50 are provided which enable the collection of fat from the grilled product on the grilling tray 18 and allow the accommodation of the grilled product in the grilling housing. This arrangement makes it also possible that after completing the grilling or broiling process the prepared food can be kept warm on the tray 18 of the lower part 10.

For holding the product to be grilled in the inner space of the grilling housing 88, a rotatable spit 53 is supported in longitudinal slits 56 extending from the edge of the side walls 54 and 55 of the half shell 93 and are arranged at different levels one above the other. The grilling spit 53 is provided with flanged driving gear driven by a motor 51, for example. In the range of the longitudinal slit 56, a keyhole-like opening 57 is arranged at least in one of the side walls, for example in the side wall 55; the keyhole 57 receives a holding pin on the housing of the drive gear 52 for the grilling spit so that the motor 51 together with its driving gear can be fixedly mounted on the grilling housing 88.

Figure 12:
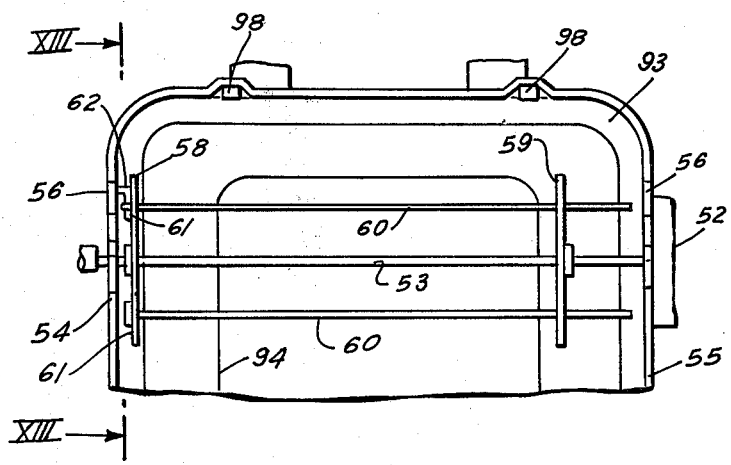
FIG. 12 is a cut-away portion of FIG. 11 showing the suspension of the grilling spit in the rear half shell of the grilling housing.
Figure 13:
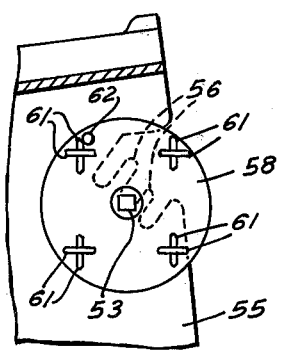
FIG. 13 is a side view taken along lines XIII—XIII in FIG. 12 showing a suspended grilling spit.

In the embodiment as shown in FIG. 12, the grilling spit 53 is constructed as the so-called "shashlik" spit, wherein the main grilling spit 53 supports two fixedly mounted disks 58 and 59. The disks 58 and 59 have the same diameters and are provided with four regularly spaced openings in which spit rods 60 are inserted and rotatably supported. In the interspace between the disk 58 and the side wall 54 of the half shell 93, the ends of the spit rods 60 are each provided with crossed wings 61. As seen from FIG. 13, a stop pin 62 is secured to the half shell 93 in such a manner that during the rotation of the disks 58 and 59 the circular part of movement of the crossed wings 61 coincides with the stop pin 62 so that the wings 61 together with the spit rods 60 are step-wise turned upon each encounter with the stop pin 62.

The switch 86 is provided for controlling step-by-step the operational temperature of the heating spirals both in the lower part 10 and in the upper part 11. The switch 86 has a rotary knob for adjusting the temperature and in addition, a selection disk 64 for setting three switching positions. In one switching position of the selection disk 64 the heating spiral in the upper part 11 is switched over to maximum heating power and operates independently of the position of the rotary knob 63; in the second switching position of the selection disk 64 the heating spiral of the upper part is completely disconnected. The third switching position of the selection disk 64 provides for the temperature control of the heating spiral in the upper part 11. The switching positions of the selection disk 64, therefore, control the temperature of the upper part 11 only and do not affect the temperature in the stationary lower part 10. The adjusted temperature can be held constant by means of thermostats (not shown) installed in the upper and lower parts.

By virtue of the multiple switching possibilities on the one side as well as by the application of the hinge joint which makes it possible to adjust various positions of the upper part with respect to the lower part on the other side, the household appliance of this invention has manifold applications such as for example, as a contact cooker, a toaster, a stationary grill, a rotational grill, a wafer making unit, and for cooking or warming food.

In employing the device of this invention as a toaster or for browning and especially in its use as a rotational grill it is advantageous that all hot plates be provided with the glass ceramic plates 19 in order that the infrared radiation from the heating spiral might take effect upon the processed product. On the other hand, in contact grilling or baking, in warming and in baking wafers, it is preferable to use metal hot plate 80 provided with a fluoroplastic lining. It is necessary therefore to install glass veramic plates on frames 65 that can be releasably mounted to the household appliance above the heating spiral. The frame 65 in the exempary embodiments shown in FIGS. 14–16, consists of two U-shaped metal round rods each forming a yoke 66, each surrounding a corresponding half of the glass ceramic plate 9 and connected to each other to form the frame. The end surfaces 67 of the yoke 66 are bridged by splice straps 68 and 69 and secured to the yokes 66 by spot welding, for example.

The splice straps 68 include two inwardly directed seats 70 arranged on both sides of the conductors 67 for supporting the glass ceramic plate 19. In addition, splice strap 68 is provided with an angle piece 71 projecting above the frame 66 and arranged between the seat 70 for being inserted into a corresponding socket 72 in the upper part 11. Also, the splice strap 69 facing the handle 83 has a seat 73 that, however, extends over the entire length of the splice strap 69. The end parts of the seat 73 are bent downwardly and abut with the resulting angle shoulders 74 upon the surrounding edge of the upper part 11. In connection with the angular piece 71 of the other splice strap 68 the shoulders 74 create a passage between the upper part 11 and the glass ceramic plate 19 through which hot air in the upper part 11 may exit. To interrupt this passage in the range of the handle 83 for avoiding the heating of the handle 83 especially in the swung open position of the upper part 11 as shown in FIG. 7, the seat 73 of the splice strap 69 is provided with a bent portion 75 by means of which the spacing between the glass ceramic plate 19 and the edge of the upper part 11 is shielded and also infrared rays are reflected. At one end of the splice strap 69 there is proviced a holding arm 76 extending outwardly past the frame 65; the holding arm 76 is slightly depressed at its front area for engaging a resilient locking arm 77 secured to the upper part 11. The angular part 71 on the splice strap 68 and the holding arm 76 on the splice strap 69 form holding means for attachment of the frame 69 to the household appliance. The lower part 10 is also provided with a socket or receptacle 72 in the range near the hinge joint and also has a resilient locking arm 77 in the range of the handle 82.

FIGS. 14–16 show the attachment of the glass ceramic plate 19 to the frame 65 by means of U-shaped clamps 78. The clamp 78 defines two arms 79 connected by a semicircular portion that resiliently surrounds and clamps the round rod portions of the frame. The transition between the bent portion and the clamping arms 80 is preferably provided with depressions 181 so that upon the insertion of the clamps 78 upon the frame 65 the depressions not only assure a better contact of the clamp with the frame but also define a spacing between the frame and the glass ceramic plate 19. The free ends of the arms 78 are slightly bent outwardly to facilitate the insertion of the glass ceramic plate. In the embodiment illustrated in FIG. 14, four clamps are employed for the attachment of the glass ceramic plate 19 to the frame. In many cases it is sufficient to hold the ceramic plate 19 in its position by two clamps only, arranged opposite to each other on the sides of the frame 66 that are free of the splice straps.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. An electrically heatable household appliance comprising a stationary lower part and a movable upper part, each of said parts being provided with an electrically heating infrared radiating member, a heat-reflecting supporting member for each heating member, an adjustable hinge joint for swingably connecting said movable part to said lower part and for adjusting the level of said upper part with respect to said lower part, means for holding said movable upper part in a predetermined position with respect to the lower part, a protective plate for each heating member, at least one of said plates being of a glass ceramic material having at least 70% transparency to infrared radiation, said protective transparent plate being disposed directly above and operatively spaced from said electrically heating member.

2. An appliance as defined in claim 1, wherein the outer surface of each protective plate is shaped.

3. An appliance as defined in claim 1, each supporting member being detachably connected to one of said parts above said electrically heatable member.

4. An appliance as defined in claim 3, wherein said supporting member includes an angle frame to which said protective plate is attached by heat-resistant adhesive means.

5. An appliance as defined in claim 3, said one part being provided with holding fingers and with retention springs, and said supporting member including corresponding holes for receiving said holding fingers and said springs.

6. An appliance as defined in claim 3, wherein said supporting member has upwardly directed walls extending above the upper surface of the protective plate to form therewith a grilling tray connected to said stationary lower part.

7. An appliance as defined in claim 3, wherein said protective plate has a dish-like configuration.

8. An appliance as defined in claim 6, further comprising a removable covering member for intercepting spattered particles of the processed product, said covering member including a U-shaped shell defining a top wall and two opposite side walls, the ends of said side walls being insertable between the upright walls of said grilling tray during the swung open position of said upper part and abutting upon the protective plate of said upper part, and a protective front shield covering the front opening of said shell.

9. An appliance as defined in claim 8, wherein two opposite side walls of said shell are provided with elongated slits extending from the edge of said side walls and arranged above each other for supporting a grilling spit.

10. An appliance as defined in claim 8, wherein said front shield has a substantially U-shaped cross-section matching that of said covering member and the opposite side walls of said shield being provided with projections for engaging corresponding wall portions of said covering member.

11. An appliance as defined in claim 8, wherein said side walls of said shell are hinged to said top wall.

12. An appliance as defined in claim 11, wherein said covering member includes means for locking said side walls in a perpendicular position thereof with respect to said top wall.

13. An appliance as defined in claim 1, said movable upper part including a supporting frame surrounding said protective plate, clamping means for releasably connecting said protective plate to said frame, and retention means for releasably coupling said frame to said upper part.

14. An appliance as defined in claim 13, said upper frame being made of a round bar, said clamping means including at least two U-shaped clamps arranged on opposite sides of said frame to clamp between its arms said protective plate.

15. An appliance as defined in claim 14, wherein the transition area between the bent portion and the arms of said clamps is depressed inwardly to form a spacing element between the frame and the protective plate.

16. An appliance as defined in claim 13, wherein said frame is assembled of two U-shaped yokes, the facing ends of said yokes being firmly connected by splice straps, said splice straps being provided with projecting seats for supporting said protective plate and with retention elements for securing said frame to said upper part.

17. An appliance as defined in claim 16, further including a handle attached to said upper part and having its attachment point remote from said hinge joint, one splice strap near the point of attachment of said handle including means for spacing and shielding said attachment point from said protective plate.

18. An appliance as defined in claim 17, wherein said splice strap includes an outwardly directed locking member and said upper part has a corresponding resilient rest member for engaging said locking member.

19. An appliance as defined in claim 17, wherein the other splice strap includes an outwardly directed projection and said upper part has a corresponding upper tube for receiving said projection.

* * * * *